United States Patent
Brown et al.

(10) Patent No.: US 8,740,396 B2
(45) Date of Patent: Jun. 3, 2014

(54) CUBE CORNER RETROREFLECTOR FOR MEASURING SIX DEGREES OF FREEDOM

(75) Inventors: Lawrence B. Brown, Cochranville, PA (US); Daniel G. Lasley, West Chester, PA (US); Jeremy M. Garey, Landenberg, PA (US); Nils P. Steffensen, Kennett Square, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 286 days.

(21) Appl. No.: 13/370,339

(22) Filed: Feb. 10, 2012

(65) Prior Publication Data

US 2012/0206808 A1 Aug. 16, 2012

Related U.S. Application Data

(60) Provisional application No. 61/442,452, filed on Feb. 14, 2011.

(51) Int. Cl.
*G02B 5/124* (2006.01)
(52) U.S. Cl.
USPC .......................................................... 359/529
(58) Field of Classification Search
USPC .......................................................... 359/529
See application file for complete search history.

(56) References Cited

U.S. PATENT DOCUMENTS

| 5,267,014 A | 11/1993 | Prenninger |
| 6,017,125 A | 1/2000 | Vann |
| 7,800,758 B1 | 9/2010 | Bridges et al. |
| 2006/0222314 A1 | 10/2006 | Zumbrunn et al. |

OTHER PUBLICATIONS

International Preliminary Report on Patentability of the International Searching Authority for PCT No. PCT/US2012/024629; Date of report issuance Aug. 21, 2013.
Hui, Elliot E., et al, "Single-Step Assembly of Complex 3-D Microstructures", Jan. 23, 2000, IEEE; pp. 602-607.
International Search Report of the International Searching Authority for PCT No. PCT/US2012/024629; Date of Mailing May 5, 2012.
Written Opinion of the International Searching Authority for PCT No. PCT/US2012/024629; Date of Mailing May 5, 2012.

*Primary Examiner* — James Phan
(74) *Attorney, Agent, or Firm* — Cantor Colburn LLP

(57) ABSTRACT

A target includes a cube corner retroreflector including three planar reflectors, each planar reflector capable of reflecting light, each planar reflector perpendicular to the other two planar reflectors, each planar reflector intersecting the other two planar reflectors in a common vertex, and each planar reflector having two intersection junctions, each intersection junction shared with an adjacent planar reflector for a total of three intersection junctions within the cube corner retroreflector. The target further includes a non-reflecting portion of each intersection junction, wherein, for at least one intersection junction, the non-reflecting portion is wider in a first region than in a second region.

17 Claims, 6 Drawing Sheets

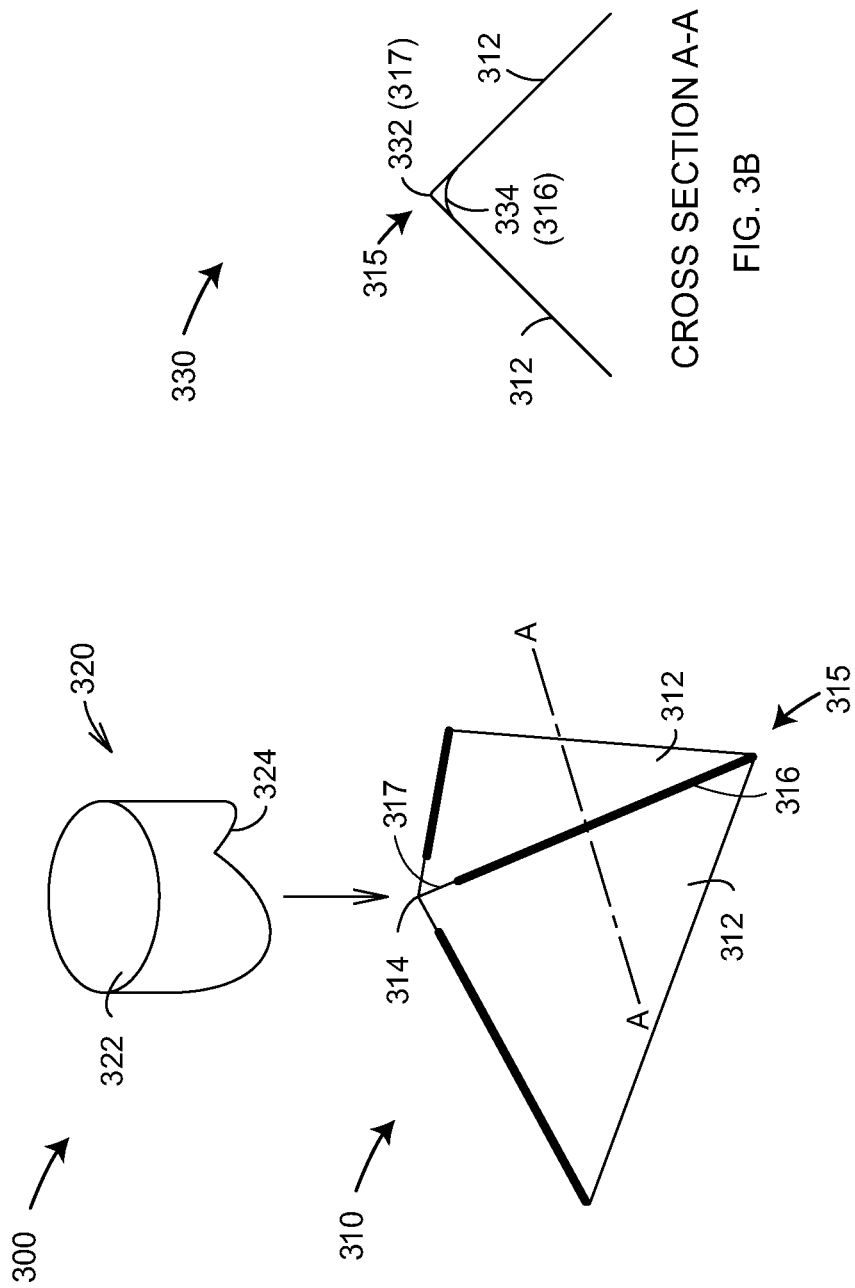

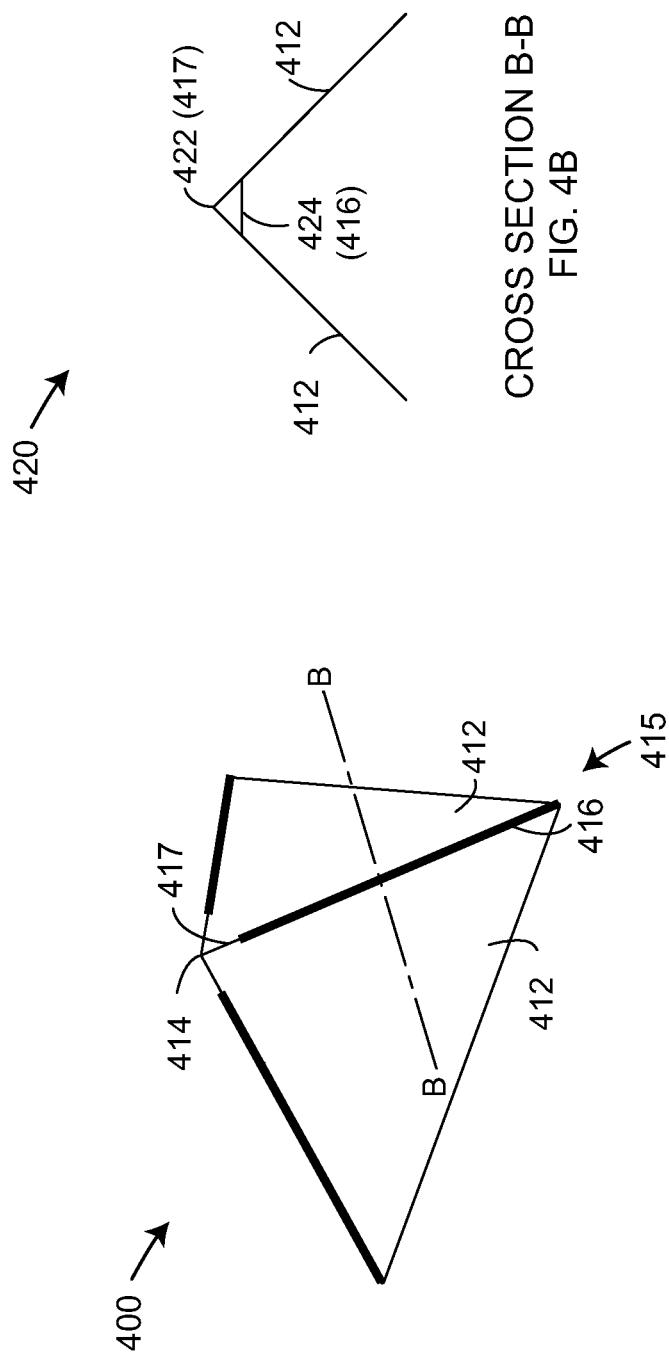

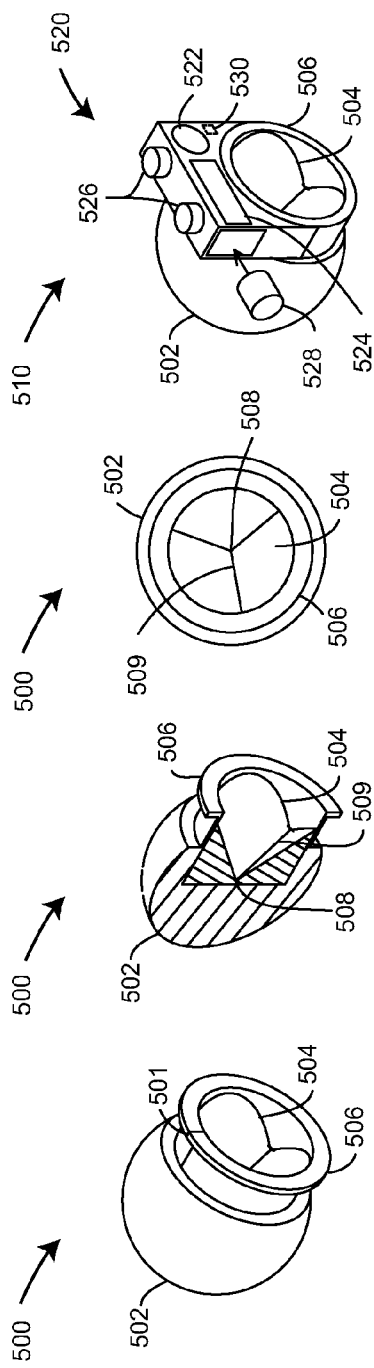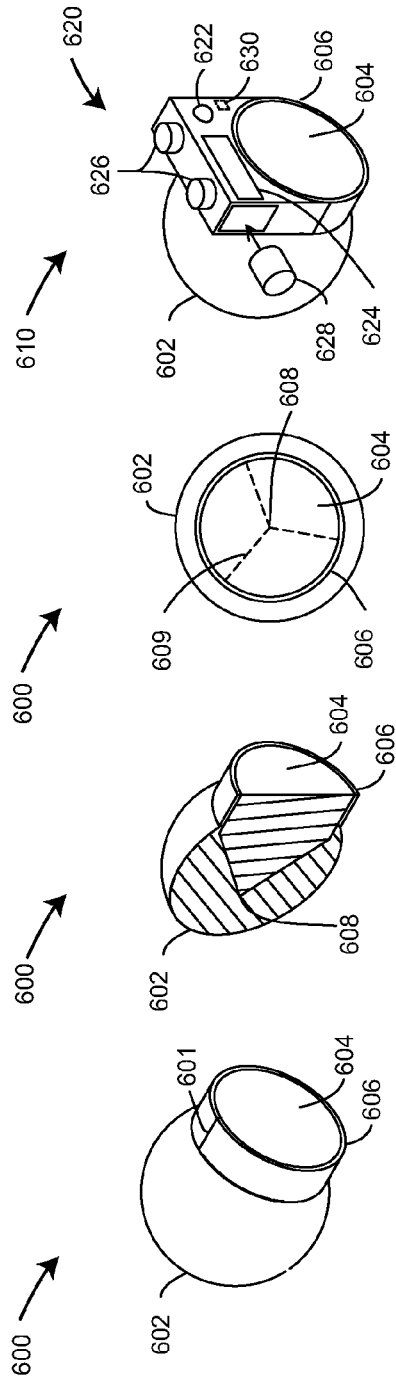

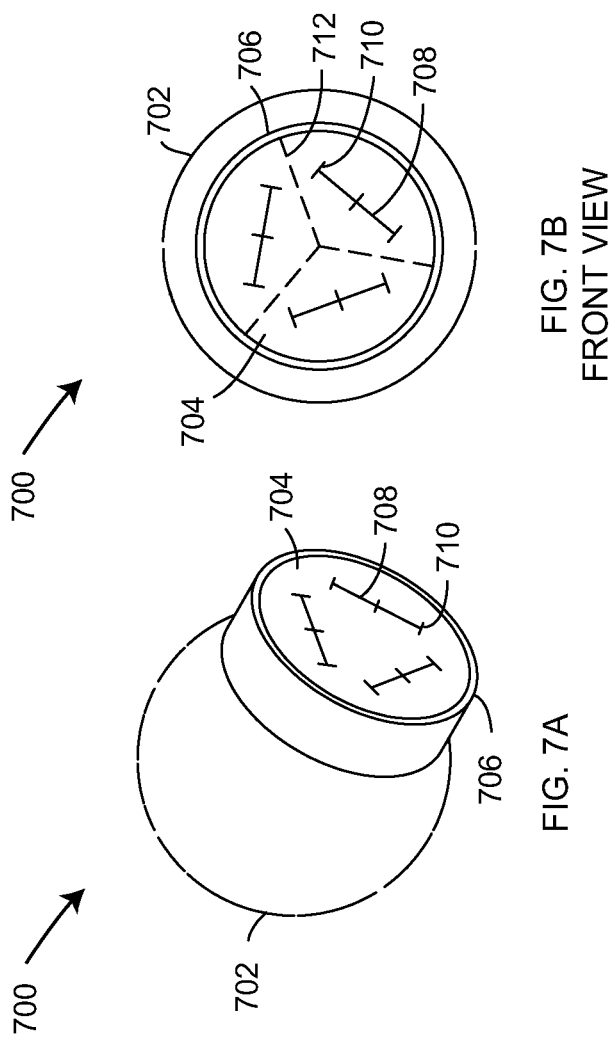

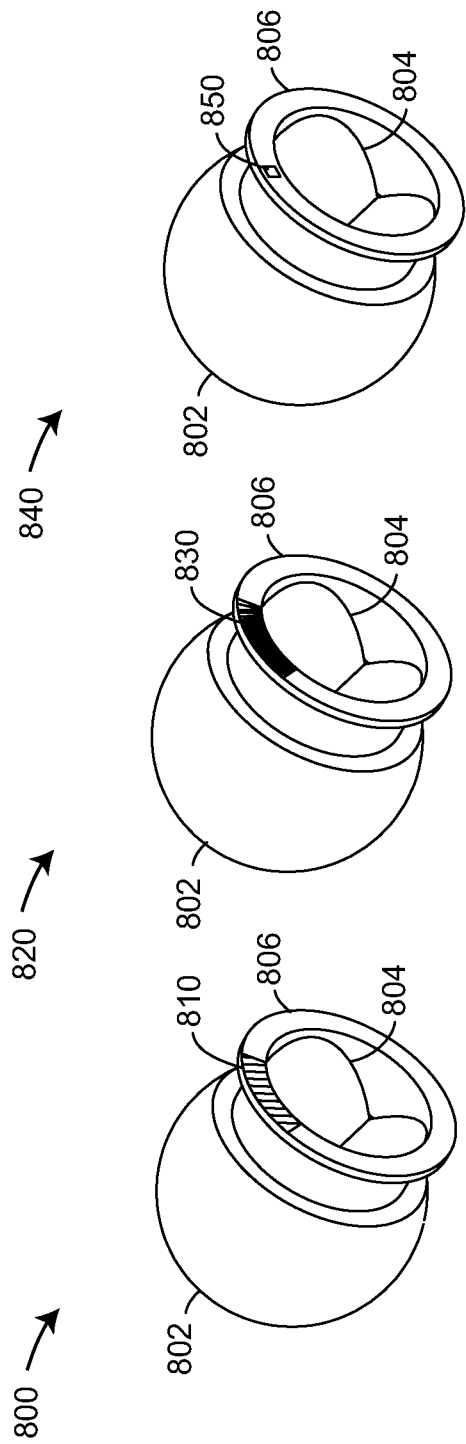

CUBE CORNER RETROREFLECTOR FOR MEASURING SIX DEGREES OF FREEDOM

CROSS REFERENCE TO RELATED APPLICATIONS

This application claims priority to U.S. Provisional Application No. 61/442,452 filed on Feb. 14, 2011, the entire contents of which are incorporated herein by reference.

FIELD OF INVENTION

The present invention relates in general to retroreflector targets and in particular to a cube corner retroreflector that measures six degrees of freedom.

BACKGROUND

There is a class of instruments that measures the coordinates of a point by sending a laser beam to a retroreflector target in contact with the point. The instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. There is another category of instruments known as total stations or tachymeters that may measure a retroreflector or a point on a diffusely scattering surface. Laser trackers, which typically have accuracies on the order of a thousand of an inch and as good as one or two micrometers under certain circumstances, are usually much more accurate than total stations or scanners. The broad definition of laser tracker, which includes laser scanners and total stations, is used throughout this application.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector includes three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

Some laser trackers have the ability to measure six degrees of freedom (6 DOF), which may include three coordinates, such as x, y, and z, and three rotations, such as pitch, roll, and yaw. An exemplary system is described in U.S. Pat. No. 7,800,758 to Bridges, et al., incorporated by reference herein. This patent discloses a probe that holds a cube corner retroreflector, onto which marks have been placed. The cube corner retroreflector is illuminated by a laser beam from the laser tracker, and the marks on the cube corner retroreflector are captured by a camera within the laser tracker. The three orientational degrees of freedom, for example, the pitch, roll, and yaw angles, are calculated based on the image obtained by the camera. The laser tracker measures a distance and two angles to the vertex of the cube-corner retroreflector. When the distance and two angles are combined with the three orientational degrees of freedom obtained from the camera image, the position of a probe tip, arranged at a prescribed position relative to the vertex of the cube corner retroreflector, can be found. Such a probe tip may be used, for example, to measure the coordinates of a "hidden" feature that is out of the line of sight of the laser beam from the laser tracker.

A potential problem in using a retroreflector with marks is that the marks reduce the power returned to the laser tracker. This may result in reduced accuracy. What is needed is a target that enables measurement of six degrees of freedom while maintaining relatively good tracking performance and relatively high accuracy in the measurement of distance and angles.

SUMMARY

A target includes a cube corner retroreflector including three planar reflectors, each planar reflector capable of reflecting light, each planar reflector perpendicular to the other two planar reflectors, each planar reflector intersecting the other two planar reflectors in a common vertex, and each planar reflector having two intersection junctions, each intersection junction shared with an adjacent planar reflector for a total of three intersection junctions within the cube corner retroreflector. The target further includes a non-reflecting portion of each intersection junction, wherein, for at least one intersection junction, the non-reflecting portion is wider in a first region than in a second region.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIGS. 3A-B illustrate production of a cube corner retroreflector by using a master element having varying radii at intersection junctions;

FIGS. 4A-B illustrate a glass cube corner having bevels at the intersection junctions;

FIGS. 5A-C are perspective, cross-sectional, and front views, respectively, of a target that includes an open-air cube-corner slug embedded within a sphere;

FIG. 5D is a perspective view of the target of FIGS. 5A-C with additional features;

FIGS. 6A-C are perspective, cross-sectional, and front views, respectively, of a target that includes a glass cube-corner embedded within a sphere;

FIG. 6D is a perspective view of the target of FIGS. 6A-C with additional features;

FIGS. 7A-B are perspective and front views, respectively, of the target of FIGS. 6A-C to which have been added marks on the top surface of the glass prism; and FIGS. 8A-C are perspective views of the target of FIGS. 5A-C to which have been added a reflective region, a bar-code pattern, and an RF identification tag, respectively.

DETAILED DESCRIPTION OF THE PREFERRED EMBODIMENTS

A cube corner retroreflector includes three planar reflectors that are mutually perpendicular. The three planar reflectors intersect at a common vertex, which in the ideal case is a point. Each of the planar reflectors has two intersection junctions, each intersection junction of which is shared with an adjacent planar reflector. The cube corner retroreflector has an interior portion that is a region of space surrounded on three sides by the planar reflectors.

Cube corner retroreflectors may be open-air cube corners or glass cube corners. Open-air cube corner retroreflectors have an interior portion of air, while the glass cube corner retroreflectors have an interior portion of glass. The glass cube corner retroreflector is a type of glass prism. One surface of the glass prism is distal to the vertex.

Each intersection junction may have a non-reflecting portion. A non-reflecting portion is formed on the junction to minimize the amount of light reflecting back into the laser tracker. The non-reflecting portion does not necessarily suppress all light that is reflected or scattered. Rather the non-reflecting portions are configured to greatly reduce the return of light to the tracker. The reduced return of light may be achieved by making the non-reflecting portion from (a) an absorbing material such as an absorbing coloration or an absorbing tape, (b) a scattering surface texture or material, (c) a curved reflective surface that results in a diverging pattern of light, or (d) a planar surface that reflects the light away from the laser tracker. Other methods for making the non-reflecting portion to achieve a reduced return of light may be utilized in light of the teachings herein, as should be apparent to one of ordinary skill in the art.

Figure 1:
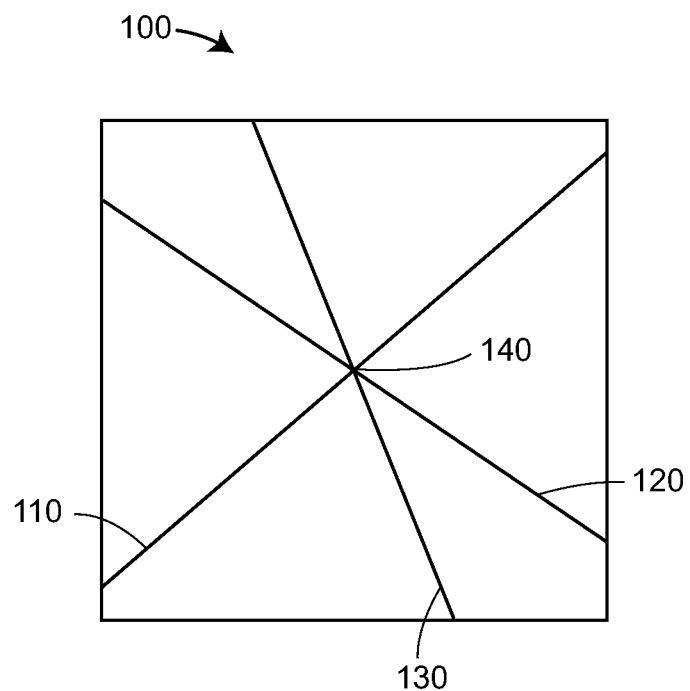
FIG. 1 is a prior art illustration of an image of three lines from marks on a cube corner retroreflector, as obtained by a camera within a laser tracker.

FIG. 1 illustrates an image pattern 100 in the prior art appearing on an orientation camera within a laser tracker. This pattern was shown previously in FIG. 12 of U.S. Pat. No. 7,800,758, incorporated by reference herein. The three lines 110, 120, 130 shown in this figure were obtained by illuminating a cube corner retroreflector onto which non-reflecting portions were placed on each of the three intersection junctions of the three planar surfaces of the cube corner retroreflector. The vertex of the cube corner retroreflector corresponds to point 140 in FIG. 1. Each of the lines 110, 120, 130 extends on both sides of the point 140 because each non-reflecting portion blocks laser light on the way into and on the way out of the cube corner.

Figure 2:
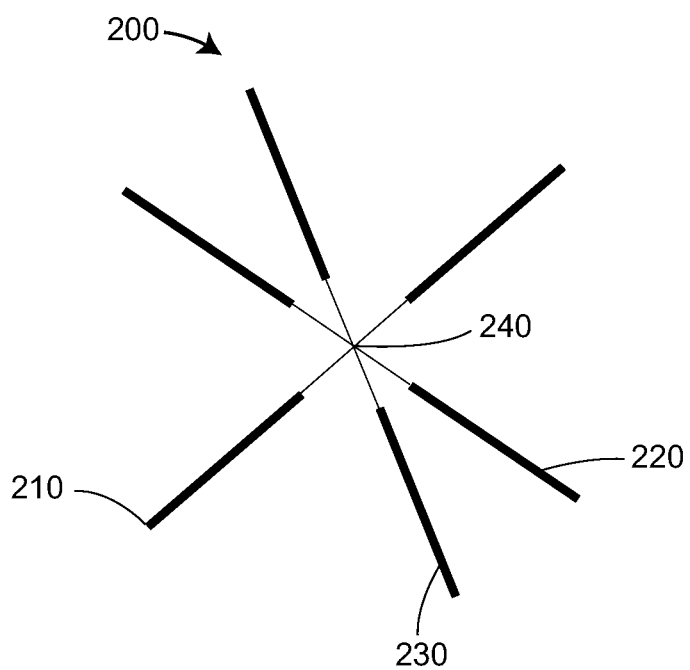
FIG. 2 is an illustration of an image of three dark lines and three light lines from marks on a cube corner retroreflector, as obtained by a camera within a laser tracker.

A potential problem with non-reflecting portions placed on a cube corner retroreflector to produce the pattern of FIG. 1 is that a large amount of light may be blocked near the center of the retroreflector where the optical power is the highest. In some cases, the result of the reduced optical power returning to the laser tracker is a decrease in tracking performance and a decrease in the accuracy of distance and angle measurements by the laser tracker. To get around this problem, the non-reflecting portions may be modified to produce a pattern 200 like that shown in FIG. 2. With non-reflecting portions placed on the intersection junctions in this manner, a relatively large amount of optical power is returned to the laser tracker, and yet the lines 210, 220, and 230 may be clearly observed by the orientation camera. In FIG. 2, the lines adjacent to the vertex point 240 are relatively narrow compared to the lines farther from the vertex.

There are at least two common methods for making open-air cube corner retroreflectors: replication and assembly of glass panels. FIG. 3A shows both the general features of the replication process and some special features of the present invention. A master element 310 is carefully machined to produce the characteristics desired in the final replicated retroreflector. For example, the master element 310 may be machined to make each of the three faces 312 almost exactly perpendicular to its two neighbors 312. For example, the faces 312 of the master element 310 may be perpendicular to each of its nearest neighbors to within one or two arc seconds. The master element 310 is coated with a reflective material such as gold. A cube corner slug 320 includes a machined blank 322 coated with a thin adhesive layer of material such as epoxy. The cube corner slug 320 is brought in contact with the master element 310. In doing so, the epoxy layer is brought into conformance with the shape of the master element 310. After the epoxy cures and the slug 320 is lifted off the master element 310, the gold layer sticks to the epoxy, thereby providing the cube corner slug 320 with a reflective coating.

Usually, the intersection junctions of the master element 310 are not perfectly sharp. One reason for this lack of sharpness is the difficulty of machining such sharp intersection junctions. Another reason is that the intersection junctions tend to chip during repeated replications if the junctions are too sharp. Instead, the intersection junctions are usually rounded with a small fillet or angled with a small bevel. Usually, for cube corners that are placed in spherically mounted retroreflectors used to measure three degrees of freedom, these features are made as small as practical. For example, a fillet applied to the intersection junctions of master element 310 might have a radius of curvature of 0.003 inch. This radius of curvature is transferred to the intersection junctions of slug 320. The fillet or bevel applied to the cube corner retroreflector is a non-reflecting portion according to the explanation given hereinabove. In other words, very little light will return to the laser tracker after striking a fillet or bevel applied to the intersection junctions of the cube corner retroreflector.

If the cube corner retroreflector is to be used in conjunction with a system to measure six degrees of freedom similar to that described in U.S. Pat. No. 7,800,758, then it may be desirable to broaden the non-reflecting portions observed by the orientation camera within the laser tracker. If a six degree-of-freedom (DOF) target is only a few meters away from the tracker, then the narrow non-reflecting portions commonly present in high quality SMRs may be wide enough to be easily seen by the orientation camera. However, if the six DOF target is located farther away—for example, up to 30 meters from the laser tracker—then the non-reflecting portions will need to be widened to make them visible on the orientation camera. For example, the non-reflecting portions might need to be about 0.5 mm wide to be clearly seen by the orientation camera.

In FIG. 3A, the non-reflecting portion 317 near the vertex 314 is narrower than the non-reflecting portion 316 farther from the vertex. By reproducing this combination of non-reflecting portions 315 on each of the three intersection junctions, a pattern like that of FIG. 2 is observed on the orientation camera within the laser tracker.

A way of implementing the combination of non-reflecting portions 315 is shown in FIG. 3B, which is a cross sectional view 330 taken through a planar slice A-A in FIG. 3A perpendicular to one of the intersection junctions. The non-reflecting portion 317 corresponds to a fillet 332 having a relatively small radius of curvature. The non-reflecting portion 316 corresponds to a fillet 334 having a relatively large radius of curvature. If desired, the fillets 332, 334 could be replaced by other shapes such as bevels. In general, the non-reflecting portions in the retroreflector slug 320 are obtained by adding additional material (e.g., epoxy) to the intersection junctions. This additional material may take such forms as fillets or bevels.

The second common method of making open-air cube corner retroreflectors is to join mirror panels into a cube-corner assembly. Three glass panels are joined together to be mutually perpendicular. There are slight gaps at the intersection regions between glass panels. Light that strikes the gaps is not reflected back to the laser tracker and so represents non-reflecting portions. If thicker lines are desired, these may be obtained, for example, by (a) increasing the width of the gap, (b) coloring (darkening) the mirrors over the desired portions, or (c) attaching low reflection material (e.g., black adhesive tape) at the intersection junctions.

Referring now to FIG. 4A, a glass cube corner retroreflector 400 has planar reflectors 412 that are mutually perpendicular. The non-reflecting portions of glass cube corner retroreflector 400 shown in FIG. 4A are obtained by removing some of the glass along the intersection junctions. The non-reflecting portion 417 near the vertex 414 is thinner than the non-reflecting portion 416 farther from the vertex 414. This is shown in more detail in the cross-sectional view B-B of FIG. 4B. The relatively thin non-reflecting portion 417 corresponds to the relatively small bevel 422, and the relatively thick non-reflecting portion 416 corresponds to the relatively large bevel 424. If desired, the bevels 422, 424 could be replaced by other shapes such as fillets. In general, the non-reflecting portions in the glass cube corner prism 400 are obtained by removing glass at the intersection junctions. This removed material may take such forms as bevels or fillets.

A cube corner retroreflector having non-reflecting portions may be embedded in a sphere, as shown in FIGS. 5A-D and 6A-D, or in a probe, as shown in FIG. 1 of U.S. Pat. No. 7,800,758. FIG. 5A shows a spherically mounted target 500 including a spherical body 502, an open-air cube corner retroreflector 504 with non-reflecting portions, a collar 506, and a reference mark 501. A cavity in the spherical body 502 is sized to accept the cube corner retroreflector 504. The cube corner retroreflector 504 is attached to the spherical body 502, possibly with adhesive. The collar 506 provides protection for the cube corner retroreflector 504 and provides a convenient grip. The reference mark is used to establish a coarse reference orientation for the target 500. FIG. 5B shows a cross sectional view taken through the center of the spherically mounted target 500. The cross section reveals the open-air cube corner 504 to be of the replicated type, but a cube corner retroreflector formed of three mirror panels could equally well be used. FIG. 5C shows a front view of the spherically mounted target 500. The three intersection junctions 509 are visible about vertex 508.

FIG. 6A shows a spherically mounted target 600 including a spherical body 602, a glass cube corner retroreflector prism 604 with non-reflecting portions, a collar 606, and a reference mark 601. A cavity in the spherical body 602 is sized to accept the cube corner retroreflector 604. The cube corner retroreflector 604 is attached to the spherical body 602. The collar 606 provides protection for the cube corner retroreflector 604 and provides a convenient grip. The reference mark is used to establish a coarse reference orientation for the spherically mounted target 600. FIG. 6B shows a cross sectional view taken through the center of the spherically mounted target 600. FIG. 6C shows a front view of the spherically mounted target 600. The three intersection junctions 609 are beneath the top surface of the glass prism and so are shown as dashed lines about the vertex 608.

FIG. 5D shows an interface component 520 attached to spherically mounted target 500 to produce an enhanced spherically mounted target 510. Interface component 520 may contain a number of optional elements. One such optional element is a reference feature 522, which may be a retroreflector (e.g., a small glass cube corner retroreflector), a region of reflective material, or a target light (e.g., an LED). The retroreflector or region of reflective material may be illuminated by a light from the laser tracker and the image captured by a camera in the laser tracker to determine the coarse orientation of the target 510. Alternatively, the target light may be illuminated and the image captured by a camera on the laser tracker to determine the coarse orientation of the target 510. The reference feature 522 may be left off altogether in which case the interface component 520 may itself serve as a reference mark. In this case, the operator aligns the target 510 in a prescribed orientation which is understood to be the coarse orientation.

Another optional element of interface component 520 is identifier element 524. The identifier element 524 may take the form of a bar-code pattern or an RF tag, for example. The tracker may read the contents of the bar code using a locator camera placed, for example, on the front of the tracker. The tracker may read the identity of the RF tag by illuminating the RF tag with radio frequency (RF) energy. The identifier element 524 may contain a serial number that identifies the particular target 510. Alternatively, it may contain one or more parameters that characterize the target 510.

Another optional element of interface component 520 is antenna 530. Antenna 530 may be used to send and/or to receive wireless data in the form of radio frequency signals. Such an antenna may be attached to a small circuit board that is powered by a small battery 528 that fits inside interface component 520. The small circuit board may be made of rigid-flex material which permits a very compact circuit to be enclosed within the interface component.

The interface component 520 may also be provided with one or more optional actuator buttons 526. The actuator buttons 526 may be used to start and stop measurements or to initiate a variety of other actions. These buttons may be used in combination with indicator lights on the laser tracker to ensure that the tracker has received the intended commands.

The interface component 520 may also contain a temperature sensor mounted within the target—for example, on the spherical body 502 or cube corner retroreflector 504. As the spherical body 502 and cube corner retroreflector 504 are heated or cooled, the position of the vertex 508 may shift since in general the spherical body 502 and cube corner retroreflector 504 may be made of different materials having different coefficients of thermal expansion (CTEs). By tracking the temperature of the cube corner retroreflector, a compensation may be performed to shift the position of the vertex 508 by an appropriate amount.

FIG. 6D shows an interface component 620 attached to spherically mounted target 600 to produce an enhanced spherically mounted target 610. Interface component 620 may contain a number of optional elements, which are analogous to the optional elements in the interface component 520. The optional elements 622, 624, 630, 628, and 626 have the same description as the optional elements 522, 524, 530, 528, and 526. Because of this, the descriptions will not be repeated here.

FIG. 7A is a perspective view of a spherically mounted target 700, which includes glass cube corner 704, spherical element 702, and collar 706. One or more non-reflecting marks 708 are placed on the top surface, which is the surface distal to the vertex, of the glass cube corner 704. A possible reason for using such marks is to provide a way of determining the three degrees of orientational freedom even when the target is tilted to an extreme angle. In FIG. 7A, three such marks 708 are provided to enable the spherically mounted target 700 to be tilted to an extreme angle in any direction. The optional marks 710 provide a way to more accurately determine the roll angle of the target 700. FIG. 7B is a front view of spherically mounted target 700.

FIGS. 8A-C show three embodiments of spherically mounted targets. In FIG. 8A, the spherically mounted target 800 includes a spherical element 802, a cube corner retroreflector 804, and a collar 806. A region of reflecting material 810 is placed on the front surface of collar 806. This region of reflecting material 810 is illuminated by light from the laser tracker and its position is determined by a camera within the tracker. The position of the region 810 is used to find the coarse orientation of the spherically mounted target 800. In FIG. 8B, the spherically mounted target 820 includes the same elements as spherically mounted target 800 except that the region of reflecting material 810 is replaced by a bar code pattern 830. The bar code pattern 830 may serve to provide an identification of the target 820 and it may also act as a region of reflecting material to provide a coarse orientation of the target 820. In FIG. 8C, the spherically mounted target 840 includes the same elements as spherically mounted target 800 except that the region of reflecting material 810 is replaced by an RF identification chip. This chip may be interrogated by an RF transmitter/receiver to obtain information about the spherically mounted target 840. This information may be a serial number or one or more parameters of the target 840.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A target comprising:
   a cube corner retroreflector including three planar reflectors, each planar reflector capable of reflecting light, each planar reflector perpendicular to the other two planar reflectors, each planar reflector intersecting the other two planar reflectors in a common vertex, and each planar reflector having two intersection junctions, each intersection junction shared with an adjacent planar reflector for a total of three intersection junctions within the cube corner retroreflector; and
   a non-reflecting portion of each intersection junction, wherein, for at least one intersection junction, the non-reflecting portion is wider in a first region than in a second region.

2. The target of claim 1, wherein, for at least one of the three intersection junctions, the first region is farther from the vertex than the second region.

3. The target of claim 1, further comprising a reference feature disposed on the target, wherein the reference feature is one of a reference mark, a reference retroreflector, a region of reflective material, and a target light source.

4. The target of claim 1, wherein an interior portion of the cube corner retroreflector surrounded on three sides by the planar reflectors is air.

5. The target of claim 4, wherein the cube corner retroreflector is replicated and the non-reflecting portions are based, at least partially, on the addition of surface material to each intersection junction.

6. The target of claim 5, wherein the additional surface material takes the form of a fillet or a bevel.

7. The target of claim 1, wherein each planar reflector is a mirror segment and the non-reflecting portions are based, at least partially, on one of a gap between the adjoining mirror segments, a coloration of adjacent regions of the adjoining mirror segments, and a low-reflection material disposed on the adjoining mirror segments.

8. The target of claim 1, wherein the planar reflectors are surfaces of a glass prism.

9. The target of claim 8, wherein the non-reflecting portions are based, at least in part, on the removal of glass from each intersection junction.

10. The target of claim 9, wherein the removed glass takes the form of a fillet or a bevel.

11. The target of claim 8, further comprising a non-reflecting mark placed on a surface of the glass prism distal to the vertex.

12. The target of claim 1, further comprising an identifier element disposed on the target, wherein the identifier element is one of an RF identification tag and a bar code pattern.

13. The target of claim 12, wherein the identifier element is configured to hold one of a serial number and a parameter of the target.

14. The target of claim 1, further comprising:
   an actuator button;
   a battery; and
   an electronic circuit configured to emit a radio frequency signal or an optical signal in response to a depression of the actuator button.

15. The target of claim 1, further comprising:
   a battery; and
   an electronic circuit configured to transmit at least one of a serial number and a parameter of the target by emitting a radio frequency signal or an optical signal.

16. The target of claim 1, further comprising:
   a temperature sensor;
   a battery; and
   an electronic circuit configured to transmit a temperature value by emitting a radio frequency signal or an optical signal.

17. The target of claim 1, further comprising a body that includes a sphere having a cavity sized to hold the cube corner retroreflector, wherein the cube corner retroreflector is disposed in the cavity.

* * * * *